(12) United States Patent
Koleoglou

(10) Patent No.: US 6,341,454 B1
(45) Date of Patent: Jan. 29, 2002

(54) COMBINATION SOLAR COLLECTION AND ROOFING SYSTEM WITH SPACER FASTENER

(76) Inventor: Alex Koleoglou, P.O. Box 477, Montauk, NY (US) 11954

( * ) Notice: Subject to any disclaimer, the term of this patent is extended or adjusted under 35 U.S.C. 154(b) by 0 days.

(21) Appl. No.: 09/468,190

(22) Filed: Dec. 21, 1999

(51) Int. Cl.[7] .............................................. E04D 13/18
(52) U.S. Cl. ........................ 52/173.3; 52/549; 52/478
(58) Field of Search .............................. 52/171.3, 173.3, 52/90.2, 518, 520, 549, 550, 551, 478, 204.6, 204.57; 136/244, 256

(56) References Cited

U.S. PATENT DOCUMENTS

| | | | | |
|---|---|---|---|---|
| 4,221,208 A | * | 9/1980 | Murphy, Jr. ................ | 126/622 |
| 5,287,670 A | * | 2/1994 | Funaki ........................ | 52/544 |
| 5,740,996 A | * | 4/1998 | Genschorek ................ | 248/237 |
| 6,065,256 A | * | 5/2000 | Joko et al. .................. | 52/173.3 |
| 6,119,415 A | * | 9/2000 | Rinklake et al. ........... | 52/173.3 |

* cited by examiner

*Primary Examiner*—Carl D. Friedman
*Assistant Examiner*—Jennifer I. Thissell
(74) *Attorney, Agent, or Firm*—Alfred M. Walker

(57) ABSTRACT

A combination solar roof collector and roofing system includes a plurality of discrete small overlapping tempered glass panels of a polygonal shape which do not require exterior molding around individual panels to provide weatherproofing. The overlapping tempered glass panels are applied like ordinary roof shingles to naturally shed water on a roof. Elastomeric moisture proof caulking is provided between the panels. The construction of solar collectors is conformable to any existing roof shape or dimensions by using specially cut perimeter glass panels. The panels are held in place by spacer fastener clips that support the glass panels and hold each panel down to resist uplift forces in strong winds. The glass panels support the weight of a person, do not require any reinforcing of the roof structure, and can be individually removed and replaced to perform any repair or adjustment to the solar panels underneath.

17 Claims, 6 Drawing Sheets

COMBINATION SOLAR COLLECTION AND ROOFING SYSTEM WITH SPACER FASTENER

FIELD OF THE INVENTION

The present invention relates to aesthetically pleasing, easily maintainable solar collector roofing systems.

BACKGROUND OF THE INVENTION

Among related patents for solar paneled roofing systems includes U.S. Pat. No. 4,280,484 of Mancosu, which discloses solar roofs, comprised of a plurality of transparent panel sheets mounted with U-shaped and L-shaped members above an air space, which is above a thermal insulating membrane. However, Mancosu '484 requires an additional peaked frame above the panel sheets.

U.S. Pat. No. 4,393,859 of Marossy discloses a solar collector roof, comprised of separate individual glass sheets, secured by a spring clip and an elongated hat-shaped section. However, Marossy '859 requires exterior frames for each glass sheet.

U.S. Pat. No. 2,256,050 of Hansen discloses a building, comprised of a trapezoidal greenhouse section with glass panels forming a polygon, including beaded molding joints. However, Hansen does not describe a solar collector system.

U.S. Pat. No. 4,119,083 of Heyen discussed sheets above an airspace, but not individual panels per se. It is for an absorber plate with a standard glass cover over absorbent fibrous members.

U.S. Pat. No. 4,138,989 of Doyle shows separate glass panels, but they require framing pieces.

U.S. Pat. No. 4,184,481 of Tornquist discusses separate triangular sheets, but they form a pyramid, not a flat roof.

U.S. Pat. Nos. 4,221,208 and 4,319,437 both of Murphy and U.S. Pat. No. 4,712,338 of Trickel disclose individual glass panels, but these are uninterrupted longitudinally extending glass panels. Murphy '208 and '437 describe long collector panels, not discrete, removable solar roofing pieces.

U.S. Pat. No. 4,336,413 of Tourneux discusses connected panels, but the panels require connecting exterior frames to support the panels and provide weatherproofing.

U.S. Pat. No. 4,738,247 of Moore discloses separate glass roofing panels, but they have heat pipes and attached to each panel.

U.S. Pat. No. 5,505,788 of Dinwoodie discusses separate interconnected photovoltaic glass panels above spacers. Furthermore, U.S. Pat. No. 5,740,096 of Genshorek describes clip devices for mounting solar plates.

The aforementioned patents have significant disadvantages, such as the requirement to add extra exterior framing or molding members, which detract aesthetically from a roof. The prior art roofing panels are bulky and elongated, and cannot be removed or replaced easily. They are not applied like ordinary roof shingles.

OBJECTS OF THE INVENTION

It is therefore an object of this invention to construct large solar roof panels that are aesthetically superior by using a glazing system of small overlapping panels of polygonal shape, which do not require exterior molding around individual panels to provide weatherproofing.

It is also an object of this invention to use overlapping tempered glass panels applied like ordinary roof shingles to naturally shed water.

It is another object of this invention to use elastomeric caulking between panels to achieve a moisture proof and air tight roof system.

It is still another object of this invention to permit the use of a second inner layer of glass for high temperature applications.

It is also an object of this invention to permit the construction of solar collectors conformable to any existing roof shape or dimensions by using specially cut perimeter glass panels.

It is an object of this invention to use special glass fasteners that support the glass panels and hold each panel down to resist uplift forces in strong winds.

It is also an object of this invention to permit faster, more convenient and better solar collector installations by installing subframing over a watertight membrane while the construction of the collectors takes place.

It is yet another object of this invention to use glass panels that can be handled by one person, support the weight of a person, do not require any reinforcing of the roof structure, and can be individually removed and replaced to perform any repair or adjustment to the solar panels underneath.

SUMMARY OF THE INVENTION

In keeping with these objects and others, which may become apparent, the present invention includes a plurality of discrete easily removable solar collector panels for a roof. Instead of long rectangular panels, the panels are discrete geometric shapes such as polygons preferably with equal sized sides, such as diamonds, hexagons, and the like. While preferably the panels are square glass panels in a diamond pattern, any regular polygon shape or even round or oval glass shingle shapes can be used if a compatible glass fastener clip is designed to support the glass and hold it down in an overlapping manner.

The shingle-like top glazing layer is used for photovoltaic as well as solar thermal applications such as hydronic water heating installations or air heating panels. The entire solar panel is built flush with the non-solar part of the roof structure in new construction by simply recessing the frame of the solar section so that the top glazing panels match the height of the regular roof shingles.

The combination solar collectors and roofing shingle panels can also be built upon the surface of an existing roof. The life of the solar collector section of roof using the present invention is indefinite, as the degradation of tempered glass under normal atmospheric conditions is negligible.

The solar roof panels are aesthetically superior because they comprise a glazing system of small overlapping panels of polygonal shape which do not require exterior molding around individual panels to provide weatherproofing.

The overlapping tempered glass panels are applied like ordinary roof shingles to naturally shed water, and only need elastomeric caulking between panels to achieve a moisture proof and air tight roof system.

The solar roofing collectors are conformable to any existing roof shape or dimensions by using specially cut perimeter glass panels, which are connected merely by special glass fasteners that support the glass panels and hold each panel down, to resist uplift forces in strong winds.

The glass panels can be handled by one person, they support the weight of a person, they do not require any reinforcing of the roof structure, and they can be individually removed and replaced to perform any repair or adjustment to the solar panels underneath.

BRIEF DESCRIPTION OF THE DRAWINGS

The present invention can best be understood in connection with the accompanying drawings, in which.

DETAILED DESCRIPTION OF THE INVENTION

Figure 1:
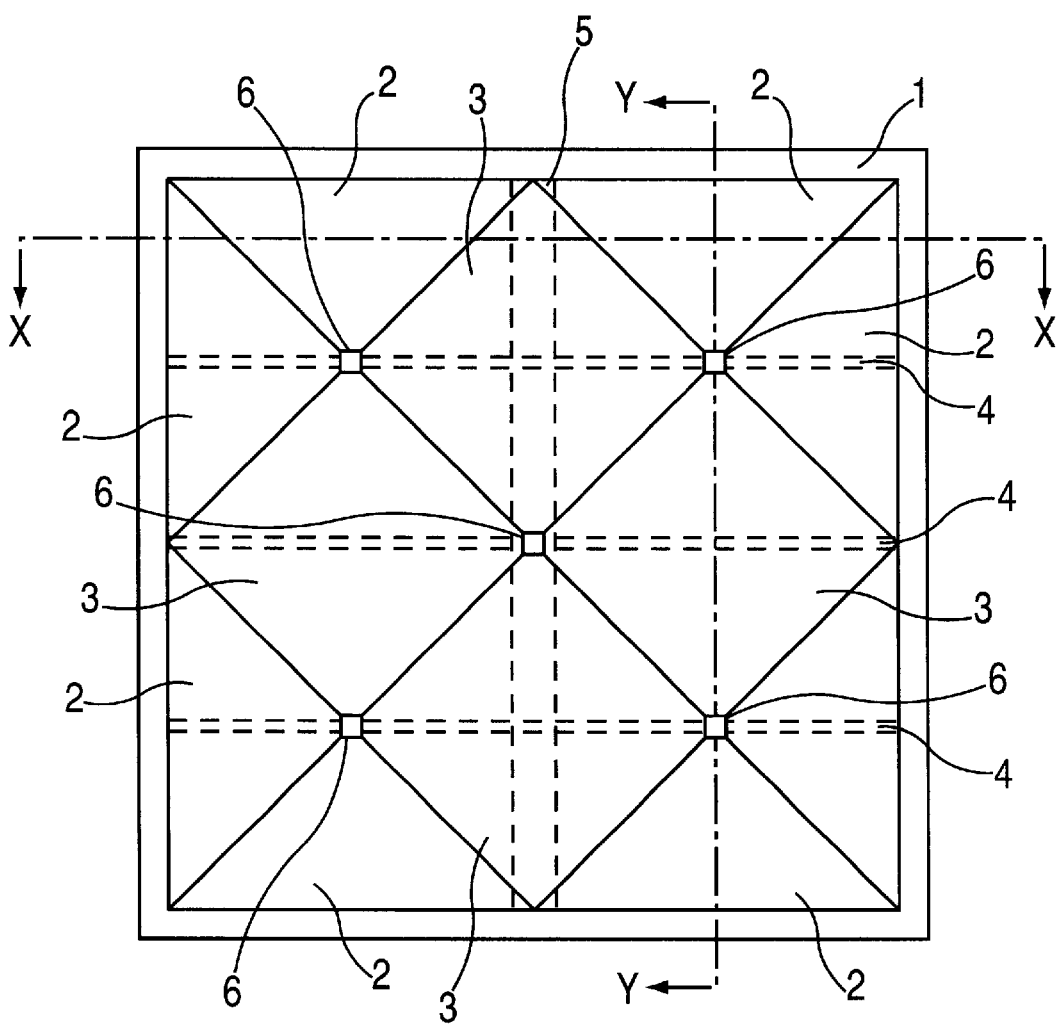
FIG. 1 is a top plan view of a solar roof collector using a diamond pattern array of tempered glass panels.
Figure 2:
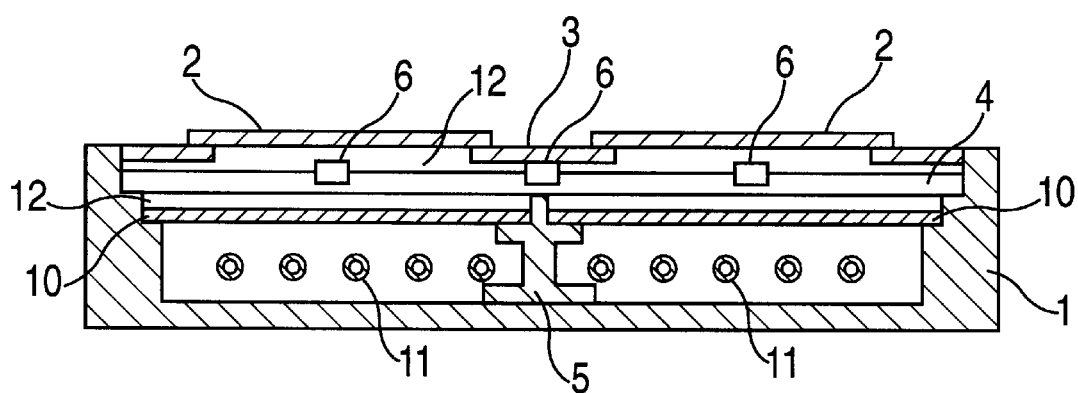
FIG. 2 is a front-end view shown in cross section thereof.
Figure 3:
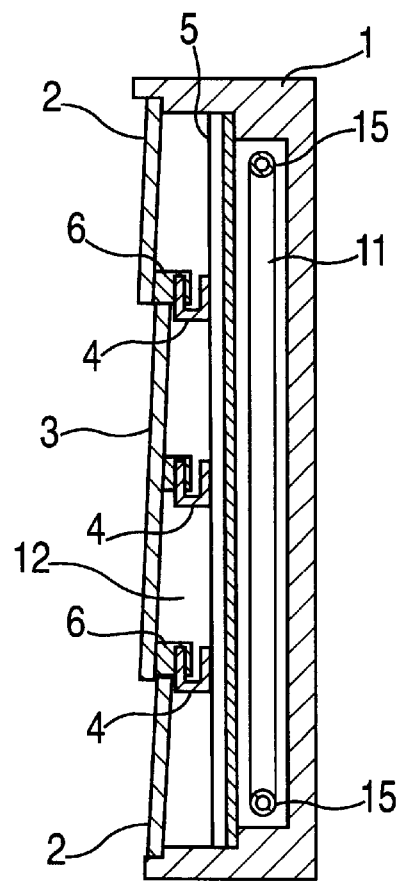
FIG. 3 is a side elevational view shown in cross section thereof.

For illustrative purposes, the detailed description is concerned with the use of square tempered glass panels installed in a diamond pattern. A hydronic solar thermal collector system is shown in FIGS. 1–3. A spacer fastener clip for this shape of glass shingle is described in detail below.

The constraints on glass panel size are those of practicality. Fully tempered glass up to a maximum size of about 36" by 36" (or about 1 meter square) can be used, but small sizes may be more aesthetically appealing and are easier for a single person to install.

Also, large panels have to be thicker to support the weight of a work person.

A silicone sealant is used to seal the overlapping edges of the roofing panels.

This sealant can be easily cut with a knife when removing a panel to replace a broken panel or to repair anything underneath.

The material of the spacer fastener clips can be any of a variety of ultraviolet resistant grades of molded plastic resins such as polycarbonate, ABS, nylon or rigid or semi-rigid blends. Metal such as die cast aluminum or zinc-aluminum can also be used. These can be coated as by dipping in an elastomeric material to prevent any possibility of chipping glass edges and to foster better gripping of the glass edges.

FIG. 1 shows a top view of a solar thermal roof collector of this invention. In a typical installation, more individual glazing panels are used and/or the individual panels are smaller. Frame 1 encloses the perimeter of the entire solar collector. Panels 2 are specially cut perimeter panels to fit dimensions of the solar collector frame 1. Although panels 3 may be any discrete polygon, preferably with equally sized sides, such as a square, diamond or hexagon, panels 3 are shown in FIG. 1 as full size diamond panels. Overlap of the panels 3 is not shown for simplicity in this view of FIG. 1.

A channel and inner glass carrier member 5 is shown supporting channel members 4 to which spacer fastener clips 6 are attached to support glass panels 2 and 3.

The cross sectional views of FIG. 2 as taken along lines X—X in FIG. 1 and as taken along lines Y—Y in FIG. 1 reveal more detail.

FIG. 2 shows the ends of the hydronic piping 11 shown beneath a second layer of glass 10 which is supported by support member 5 which also supports channel members 4. Some overlap between the glass panels 2 and 3 can be seen in this view.

An insulating air space 12 exists between the top layer of tempered glass shingles 2 and 3 and the inner layer of large panels of glass 10.

FIG. 3 shows the typical "shingle like" overlap of glass panels 2 and 3 as well as the U-channel cross sectional view of channel members 4 supporting spacer fastener clips 6. Hydronic manifolds 15 are shown. There is no individual framing around the edges of the individual top glass panels 2 or 3.

Figure 4:
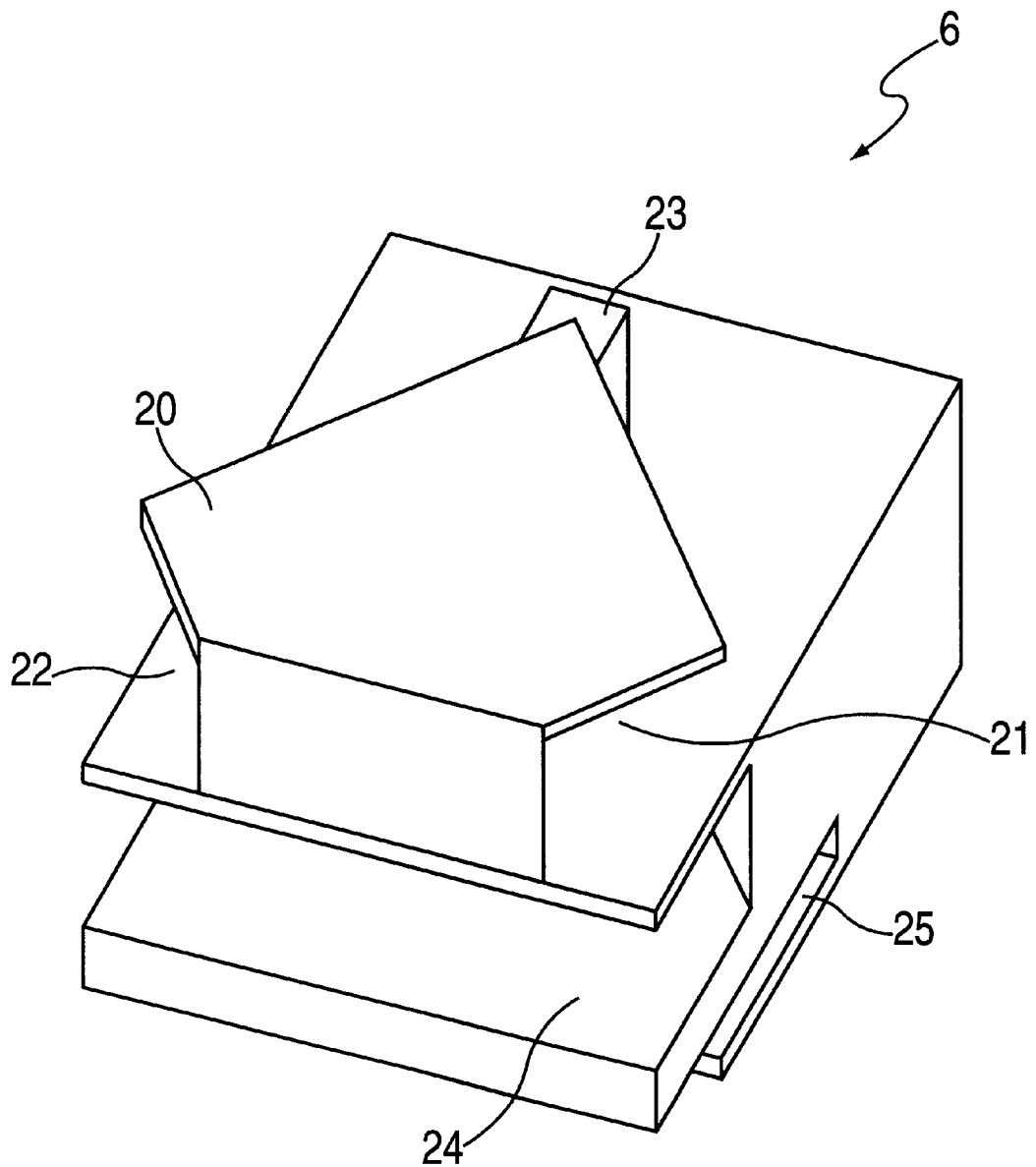
FIG. 4 is an isometric view of the spacer fastener clip used for holding the panels of the combination solar collector and roofing panel system of the present invention.

FIG. 4 is an isometric view of the spacer fastener clip 6, used to connect and support panels 3.

Figure 5:
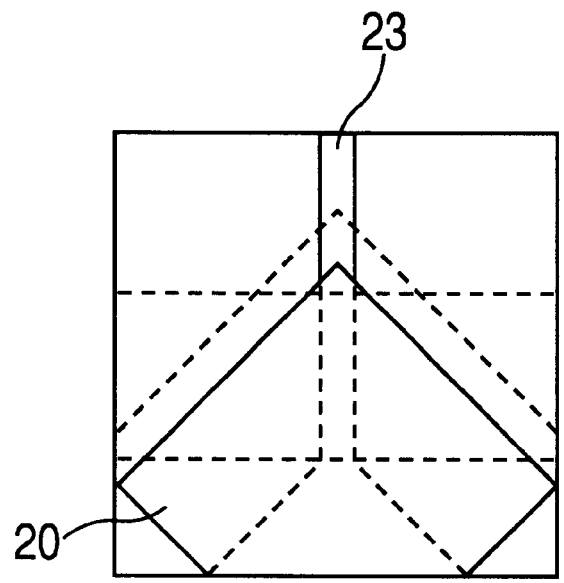
FIG. 5 is a top plan view of the spacer fastener clips shown in FIG. 4.
Figure 6:
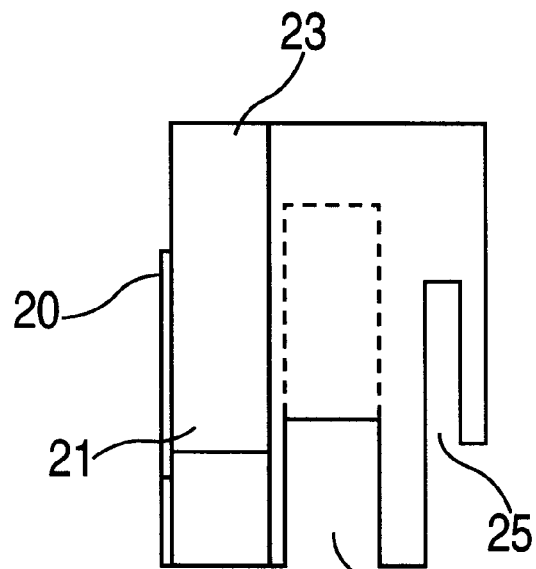
FIG. 6 is a side elevational view of the spacer fastener clip shown in FIG. 4.

FIGS. 5 and 6 are top and side views of the same spacer fastener clip 6. Top flange 20 is a resting-place for the lowest corner of the topmost layer of glazing 3 to touch a particular clip 6. Recess 21 and recess 22 with a 45 degree wall (as shown in phantom lines in FIG. 5), and separator wall 23 form a support and hold down channel for the side corners of the next layer of glazing 2 or 3 down to the right and left respectively of separator fastener 6. Recess 24 with its 45 degree walls, as shown in FIG. 5 in phantom lines, is a support and holds down for the top corner of the lowest layer of glazing 2 or 3 to touch separator fastener clip 6. Recess 25 is the channel for support and hold down of spacer fastener clip 6 to a support channel 4. For application, it is just "hung" on the top lip of the open end of channel 4.

Figure 7:
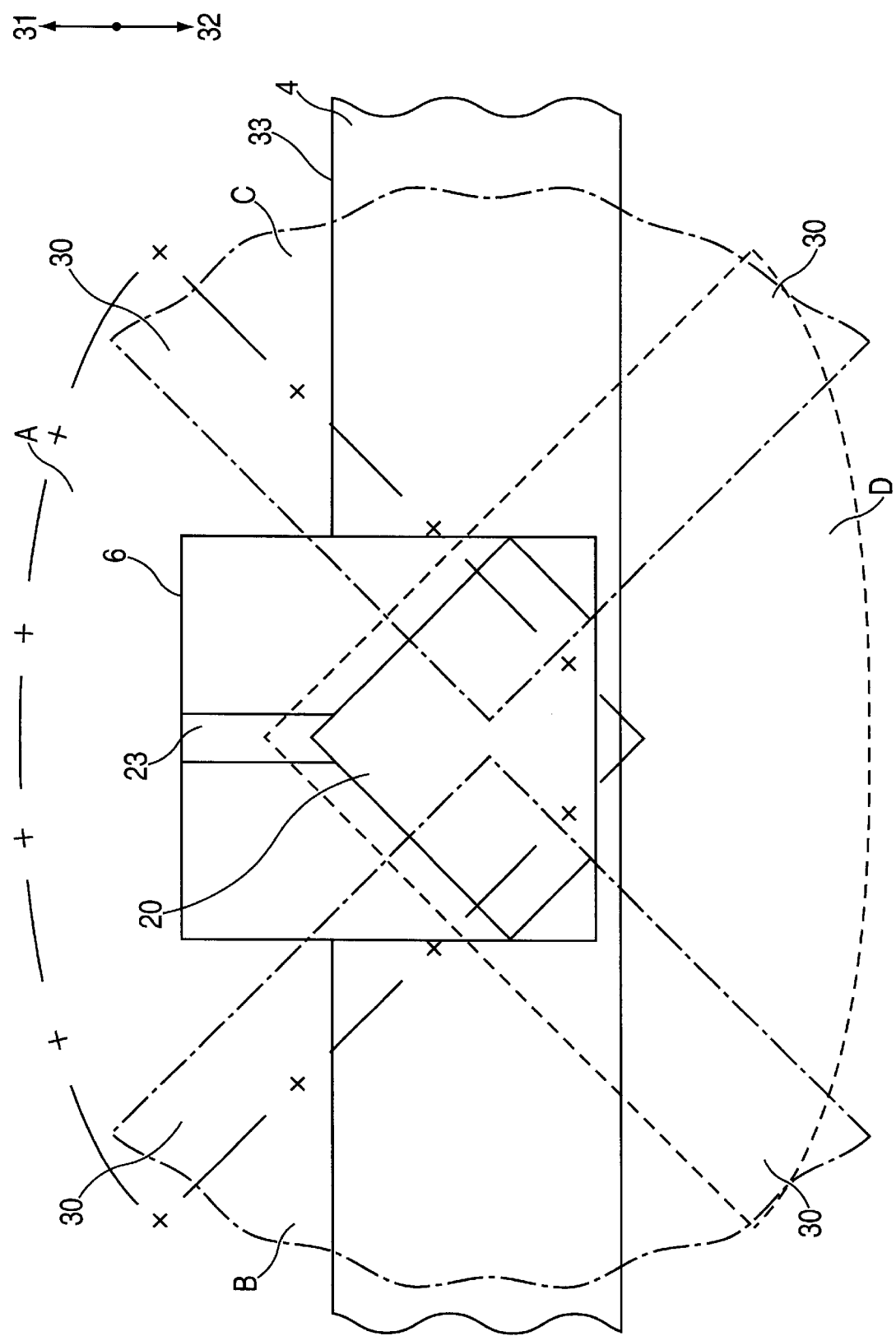
FIG. 7 is a close-up detail top plan view of a plurality of roofing panels as in FIG. 1, showing corners of four overlapping glass panels engaging the spacer fastener clip of FIG. 4.

FIG. 7 is a close-up detail top view of the relationship of several panels of top glazing 2 or 3 with a separator fastener clip 6. Clip 6 is shown in a top view in solid lines.

The outline of the corner of each glazing panel 2 or 3 is shown in a different style of broken line to illustrate the particular layer from top to bottom.

The topmost layer "A" is shown in long dashes interrupted with small crosses. It lies atop the top flange 20 of clip 6.

The next layer down are panels B and C (shown in alternating long and short dashed line segments) on the left and right sides of clip 6. These lie in recesses 22 and 21 respectively in clip 6.

Finally, the bottom layer D (shown as short dashed segments) of this three layer stack, lies in recess 24 of clip 6.

All three glass layers overlap at their edges 30. This region between each pair of glazing layers is sealed with silicone sealant (not shown). The open lip edge 33 of channel 4 supporting clip 6 is shown; this lies below glass layer D.

Figure 8:
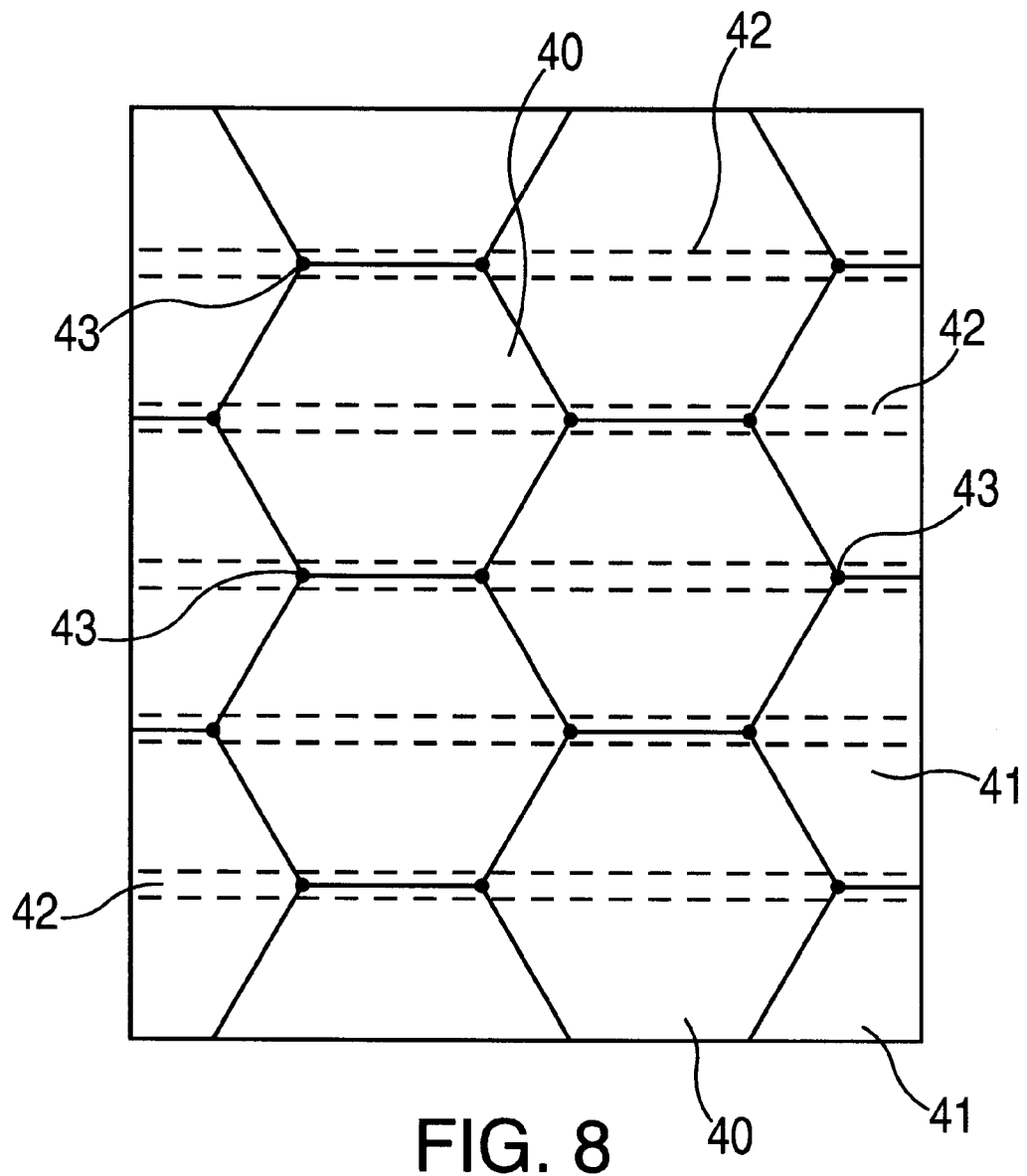
FIG. 8 is a top plan view of another embodiment for an array of hexagon-shaped solar collector and roofing panels.

FIG. 8 shows an alternate embodiment of roof solar collector using hexagonal top glazing panels 40. Specially cut perimeter panels 41 fit the pattern to the edge requirements. Support channels 42 support spacer fastener clips 43 which are specially designed to support and properly space each full 40 or partial 41 hexagonal panel in an overlapping (not shown) manner.

It is further known that other modifications may be made to the present invention without departing from the scope of the invention, as noted in the appended Claims.

I claim:

1. A combination solar panel and roofing system comprising:

a plurality of discrete solar roof glass panels, forming a glazing system, said glass panels being placed in overlapping relationship, said glass panels being of a geometric shape, said glass panels being provided without exterior molding around individual glass panels of said plurality of glass panels, a plurality of discrete spacer clip fasteners supporting said glass panels and holding each said glass panel down to resist uplift forces in strong winds, each said spacer clip fastener having respective recesses, each said recess separated from each other adjacent recess by at least one separator wall, each said spacer clip supporting adjacent glass panels of said plurality of glass panels in a spaced apart relationship from each other, each said spacer clip fastener supported by and connected to respective longitudinally extending channel members extending above and spaced apart from a solar energy medium.

2. The combination solar collector and roofing system as in claim 1 wherein said glass panels are light transmissive tempered glass.

3. The combination solar collector and roofing system as in claim 1, wherein said glass panels are about 36 inches by 36 inches.

4. The combination solar collector and roofing system as in claim 1 further comprising a silicone sealant sealing overlapping edges of said glass panels.

5. The combination solar collector and roofing system as in claim 1, wherein said spacer fastener clips are made of ultraviolet resistant grades of molded plastic resins.

6. The combination solar collector and roofing system as in claim 5, wherein said resins are polycarbonate.

7. The combination solar collector and roofing system as in claim 1, wherein said spacer fastener clips are die cast aluminum.

8. The combination solar collector and roofing system as in claim 1, wherein said space fastener clips are coated.

9. The combination solar collector and roofing system as in claim 1, wherein said spacer clip fasteners support said glass panels and hold said panels down in an overlapping manner.

10. A combination solar panel and roofing system comprising:

a plurality of discrete solar roof glass panels, forming a glazing system, said glass panels being placed in overlapping relationship, said glass panels being of a geometric shape, said glass panels being provided without exterior molding around individual glass panels of said plurality of glass panels, a plurality of discrete spacer clip fasteners supporting said glass panels and holding each said glass panel down to resist uplift forces in strong winds, each said spacer clip fastener supported by and connected to respective longitudinally extending channel members extending above and spaced apart from a solar energy medium, wherein said glass panels are square glass panels placed in a diamond pattern.

11. A combination solar panel and roofing system comprising:

a plurality of discrete solar roof glass panels, forming a glazing system, said glass panels being placed in overlapping relationship, said glass panels being of a geometric shape, said glass panels being provided without exterior molding around individual glass panels of said plurality of glass panels, a plurality of discrete spacer clip fasteners supporting said glass panels and holding each said glass panel down to resist uplift forces in strong winds, each said discrete spacer clip fastener supported by and connected to respective longitudinally extending channel members extending above and spaced apart from a solar energy medium, wherein said glass panels comprise a polygon shape.

12. A combination solar panel and roofing system comprising:

a plurality of discrete solar roof glass panels, forming a glazing system, said glass panels being placed in overlapping relationship, said glass panels being of a geometric shape, said glass panels being provided without exterior molding around individual glass panels of said plurality of panels, a plurality of spacer clip fasteners supporting said glass panels and holding each said glass panel down to resist uplift forces in strong winds, each said spacer clip fastener supported by and connected to respective longitudinally extending channel members extending above and spaced apart from a solar energy medium, wherein said solar glass panels are built flush with a non-solar part of a roof structure by recessing said solar glass panels so that respective top glass panels of said plurality of glass panels match the height of the regular roof shingles.

13. A solar thermal roof collector, comprising:

a plurality of individual solar collector glass panels including a set of perimeter edge glass panels and a set of interior glass panels;

a frame enclosing a perimeter edge of said solar collector;

said set of perimeter edge glass panels fitted to said solar collector frame, said second set of interior glass panels being discrete polygons oriented edge to edge in a slight overlapping pattern in an area provided between said perimeter edge glass panels;

a channel and inner glass carrier support member supporting a plurality of longitudinally extending channel members, said longitudinally extending channel members supporting a plurality of spacer fastener clips, said spacer fastener clip s joining adjacent glass panels;

a set of hydronic piping members being provided beneath a second layer of glass, said second layer of glass supported by said channel and inner carrier support member supporting said longitudinally extending channel members; and, an insulating air space being provided between said plurality of glass panels and said inner layer of glass.

14. The solar thermal roof collector as in claim 13, wherein said longitudinally extending channel members supporting said spacer fastener clips are U-shaped in cross section.

15. The solar thermal roof collector as in claim 13, wherein each said spacer fastener clip includes a top flange being a resting place for a lowest corner of a topmost glass panel;

said spacer fastener clip having a plurality of angled recesses and a separator wall forming a support and hold down channel for side corners of adjacent glass panels located to the right and left respectively of said spacer fastener clip, one of said recesses supporting and holding down a top corner of a lowest layer of said adjacent glass panels, another of said recesses being a channel for supporting and holding down said spacer fastener clip to a longitudinally extending support channel member of said plurality of longitudinally extending support channel members.

16. The solar thermal roof collector as in claim 15, wherein adjacent edges of said glass panels are sealed with a sealant.

17. The solar thermal roof collector as in claim 15, wherein said glass panels are made of tempered glass.

* * * * *